United States Patent Office 2,902,461
Patented Sept. 1, 1959

2,902,461

POLYESTERS OF DIPHENYLADIPIC ACID AND PROCESS OF MAKING SAME

Charles E. Frank and Harry Greenberg, Cincinnati, Ohio, assignors to National Distillers and Chemical Corporation, New York, N.Y., a corporation of Virginia No Drawing. Application June 10, 1955
Serial No. 514,759

17 Claims. (Cl. 260—45.4)

The present invention relates broadly to a novel class of synthetic ester products and a process for their preparation and, more particularly, to a novel class of polyester compositions. Still more particularly, it relates to polyesters which are further modified with other organic materials to yield highly useful derivatives thereof.

It is an object of this invention to provide a novel class of ester products useful as plasticizers and softening agents for high molecular weight organic materials, including vinyl resins.

It is another object of this invention to provide a novel class of ester products and derivatives thereof having highly useful properties and of value in the field of synthetic rubbers, resins, synthetic fibers, lubricants, and others.

Still another object of this invention is to provide novel ester products and certain derivatives thereof in which the ester component is prepared by use of an acidic reactant believed to be novel for use in preparation of ester products. Still other objects of the invention will be apparent from the description thereof as set forth hereinafter.

In general aspect, the invention relates to ester products comprising an ester component derived from a diphenyladipic acid, or such an acid in which at least one of the phenyl radicals contains an alkyl substituent or substituents for nuclear hydrogen atoms, or mixtures of such acids. Specific illustrations of such acids include $\alpha,\alpha'$-diphenyladipic acid, $\alpha,\alpha'$-ditolyladipic acid, and the like. Generally, ester products as embodied herein may be prepared by subjecting a suitable glycol and an acidic reactant comprising a diphenyladipic acid as aforesaid to esterification reaction conditions with elimination of water formed by the esterification reaction.

As a result of the type and amounts of reactants employed in their formation, the polyesters as embodied herein may contain active terminal groups which are either carboxyl or hydroxyl groups depending upon whether an acid or a glycol was the last compound to react in the formation of the molecule. The esters described herein may then be lengthened by controlled reaction between such active terminal groups and other reagents. Generally, the polyester is lengthened further by reaction between such hydrogen-bearing terminal groups and a bifunctional material which is reactive therewith, as for example, an organic diisocyanate. The resulting formation of linkages between the diisocyanate groups and the terminal groups of the polyester produce a chain extended polymer. In instances wherein there is a terminal hydroxyl group, reaction with the diisocyanate results in a urethane linkage whereas, in the case of terminal carboxyl groups, the resulting linkage is amidic. In either case, the urethane linkage and amide linkage have available hydrogen atoms for reaction with an additional bifunctional material, such as a diisocyanate and, by reaction of the available hydrogen atoms therewith, it is possible to cross-link the chain extended polymer at various points along its chain.

The degree and state of polymerization of the polyesters prepared as embodied herein may be conveniently determined by analysis for the average number of carboxyl and hydroxyl groups in a given amount of the polyester. The acid number is a measure of the number of terminal carboxyl groups, and the hydroxyl number is a measure of the number of terminal hydroxyl groups. The sum of the carboxyl and hydroxyl numbers indicates the reaction number, i.e., the average number of reactive terminal groups, present in the polyester product which, in turn, is an indication of the degree of polymerization.

If the ester products embodied herein are to be converted into diisocyanate modified products, the polyesters must be substantially anhydrous. This can be accomplished by heating or by introduction of inert gases or some inert drying agent. The polyesters preferred for further reaction, such as with diisocyanates, should have a reactive number of up to about 100 and, preferably, from about 40 to about 60. For converting the polyesters into the diisocyanate modified products, the diisocyanates are preferably used in excess over the polyester terminal hydroxyl groups in the polyesters. Generally, an excess of 20 to 100% is adequate. Any of a variety of diisocyanates may be used, including both aliphatic types such as hexamethylene diisocyanate, octamethylene diisocyanate, and decamethylene diisocyanate, and aromatic types such as naphthalene-1,5-diisocyanate, 4,4'-diphenyl diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, p-phenylene diisocyanate, and others.

Also embodied herein are the polyesters modified with diisocyanates as aforedescribed and further modified by interaction with other additives, particularly bifunctional organic materials. It is possible to react such further modifying materials either simultaneously with, or subsequent to, the reaction between the polyesters and diisocyanates. Such other bifunctional additives may be of the types that contain two groups each having an active available hydrogen. The bivalent radical to which they are attached can be either aliphatic or aromatic. Compounds which are useful for such a purpose include diamines, dibasic carboxylic acids, amino acids, hydroxyl acids, and amino alcohols, as well as certain ureas and substituted ureas. Diamines and diacids have been found to be particularly suitable for such usage. Such further modification of the diisocyanate-modified polyesters results in further cross-linking of the macromolecules and formation of a rubber-like state as, in general, the amount of bifunctional additives employed is less than, or equal to, the amount equivalent to the excess of isocyanate groups in the polymers.

Diisocyanate modified polyesters as embodied herein may be prepared as elastomeric products, as tough resins, infusible resins, and the like, depending on the particular reactants employed. As to the elastomeric products, they may be used in cured or uncured state for many requirements wherein elasticity, resistance to chemicals, resistance to swelling, etc. is desired.

In preparation of the novel ester products embodied herein, any of a wide variety of glycols may be employed, including saturated and unsaturated aliphatic glycols that may range over a wide range of carbon atom content. Thus glycols useful for practice of the invention include ethylene glycol, diethylene glycol, 1,2-propylene glycol, 1,3-butylene glycol, 1,6-hexanediol, octamethylene glycol, dodecamethylene glycol, 2-ethyl-1, 2-ethyl-1,8-octanediol, 3-ethyl-1,10-decanediol, 3,6-diethyl-1,8-octanediol, 4,7-diethyl-2,9-decanediol, 3,13-tetradecanediol, and others.

As aforesaid, an important aspect of the invention is the use, for ester formation with the glycol, of an acidic reactant comprising a diphenyladipic acid, or such an acid in which a phenyl radical or phenyl radicals contain an alkyl substituent for a nuclear hydrogen atom, or mixtures thereof. Thus, as embodied herein, the polyesters are characterized by containing a unit of the following structure

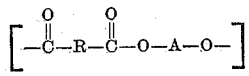

wherein R is the hydrocarbon portion of a diphenyladipic acid as aforedescribed, and A is the hydrocarbon portion of a glycol. More specifically, the esters embodied herein contain a unit of the following structure:

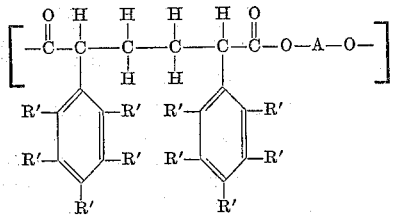

wherein A is the hydrocarbon portion of a glycol, and R' is hydrogen or alkyl; and, still more specifically, the polyesters are characterized by containing a unit of the following structure resulting from use of α,α'-diphenyladipic acid for esterification reaction with a glycol:

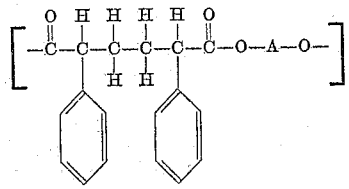

wherein A has the significance aforesaid, and preferably, is a hydrocarbon portion of an aliphatic glycol.

Such acids, or mixtures thereof, may be used as the sole acidic reactant for ester formation with the glycol or mixtures of glycols or, as is illustrated hereinafter, the acidic reactant may comprise, in addition to diphenyladipic acid or the described alkyl-substituted diphenyladipic acid, another acid or mixture of acids, whereby the resulting ester product comprises a copolyester of said diphenyladipic acids and said other acid. For such usage, the other acid may be any of a wide variety of dibasic acids, or their anhydrides, including malonic acid, succinic acid, adipic acid, methyladipic acid, fumaric acid, maleic acid, malic acid, dihydromuconic acid, azelaic acid, sebacic acid, suberic acid, phthalic acid, terephthalic acid, and others. For preparation of unsaturated polyesters, maleic anhydride is particularly suitable for use as a component of the acidic reactant comprising a diphenyladipic acid as aforedefined. Additionally, monobasic acids may be included in the acidic reactant in certain instances and, particularly as chain stopping agents when it is desired to control the extent of polymerization of the polyesters formed by esterification reaction between a suitable glycol and an acidic reactant comprising a diphenyladipic acid as aforedescribed. For such a purpose, suitable acids include acetic acid, propionic acid, butyric acid, valeric acid, pelargonic acid, and higher monocarboxylic acids.

In preparation of the products embodied herein, mixtures of various of the glycols and acids, in addition to the essential diphenyladipic acid component, can also be used, the resulting products being mixed polyesters.

The condensation of the glycols with the acidic reactant may be accomplished by heating the reactants, preferably at 100–250° C., or higher, with or without a reaction diluent. Use of a slight excess of glycol is preferred to insure that little or no acidic component remains in the final ester product. For relatively non-acidic products, the terminal groups will be predominantly alcoholic hydroxyl groups. During the reaction, the water by-product that is formed should be removed from the reacting mixture by distillation in order to insure completion of the esterification reaction.

In the preparation of ester products as embodied herein, and in which, unsaturation exists due to use of an unsaturated glycol, or unsaturated acid, or both, the unsaturated ester product may be dissolved in styrene or other suitable vinyl aromatic compound which serves as a solvent as well as a reactant. By dissolving the unsaturated ester product in a vinyl aromatic such as styrene, diallylphthalate, triallyl cyanurate, and the like, handling of the ester product is facilitated while, at the same time, providing a composition that is curable to highly desirable properties whereby they are useful as structural materials, as low temperature molding or embedding ("potting") materials, for preparation of glass fiber reinforced products such as translucent sheets, panels, etc., boat hulls, fishing rods, and the like.

In the polymerization of unsaturated polyester-styrene mixtures to fully cured materials, a catalyst is generally employed. Useful therefor are free radical initiators such as peroxides and azo compounds. Many compounds of the peroxide type are available for such a purpose and choice of a particular peroxide depends upon several factors. The acyl peroxides such as benzoyl peroxide can be used as well as aldehyde or ketone peroxides, for example, methyl ethyl ketone peroxide or cyclohexanone peroxide. Cumene peroxide is also useful as a catalyst. It has been found to be convenient to disperse the peroxide catalyst into inert liquids such as dimethylphthalate or tricresyl phosphate before addition to the unsaturated polyesters. The amount of catalyst that will produce satisfactorily cured resins having optimum characteristics depends on many factors, including the type of resin, desired speed of cure, etc. In general, from 0.1 to 2.0% of peroxide is sufficient, although somewhat higher concentrations are usually required for thin laminates.

For the polymerization, suitable promoters and activators may be used to alter the so-called induction period, i.e., the time required for gelation, and the cure time, which is the time required for the resin to become fully cured. Cobalt naphthenate is typical of such an activator although certain amines may be used for such a purpose.

In order to illustrate the invention, the following specific embodiments are set forth in which all parts are expressed by weight. It is not intended, however, to limit the invention specifically to the products and processes of these examples.

*Example I*

α,α'-diphenyladipic acid (298 parts) having a neutral equivalent of 152–153, and diethylene glycol (127 parts) were heated while being continuously stirred in a three-neck flask fitted with a $CO_2$ sparger, a thermometer, distillation head and condenser, over a period of three hours at 170–220° C. At the end of that period, about 75% of the theoretical amount of water for the condensation reaction was removed and the reaction product had an acid number of 32 and a hydroxyl number of 35.1. The temperature of the reaction mixture was then raised to 225° C. over a period of two hours and the pressure reduced to 10 mm. Hg. The resulting product was a semi-solid polyester having a final acid number of 6.2 and suitable for use as a non-migratory plasticizer for vinyl chloride resins.

*Example II*

The polyester (500 parts) of Example I was mixed with 61 parts of 1,8-octamethylene diisocyanate and cured at 120–140° C. for 24 hours. During the initial stages of reaction, a small amount of gas evolution occurred followed by loss of tackiness of the reaction product to yield a tough resilient resin.

*Example III*

The polyester (500 parts) of Example I was cured at 120–130° C. for 20 hours with 61 parts of a mixture of isomers of tolylene diisocyanate. The resulting product was an amber-colored, infusible resin.

*Example IV*

Maleic anhydride (70 parts) and diphenyladipic acid (215 parts) were added to 167 parts of diethylene glycol (10% molar excess) in a three-neck reactor provided with a stirrer, thermometer, $CO_2$ sparger, distillation head, and condenser. After establishing a blanket of carbon dioxide gas by placing the sparger in operation, a temperature of 140° C. was used to initiate removal of water from the reaction mass. The temperature was slowly raised to 217° C. over a period of six hours, during which time the acid number slowly dropped to a final value of 30. The resulting product was a very viscous, slightly amber-colored unsaturated copolyester that was curable by reaction with vinyl aromatics to hard, clear non-shatterable resins.

*Example V*

The polyester (100 parts) of Example IV was mixed with styrene (42.8 parts) thereby providing a 70% varnish. The mixture was then cured, in the presence of 1% of benzoyl peroxide, at 100° C. for ten minutes whereby a hard, clear, non-shatterable resin was produced that possessed excellent flexural strength, was completely insoluble in ordinary organic solvents and was useful for the preparation of glass laminates. By activation of the benzoyl peroxide with cobalt naphthenate (up to 300 p.p.m. of metal), curing of the copolyester-styrene mixture was effected at room temperature, thus providing an excellent potting resin.

*Example VI*

A mixture of α,α'-diphenyladipic acid (1/20 mol) and dodecamethylene glycol (1/20 mol) was heated, in an apparatus as described in Example I, for two days at 260° C. and under a pressure of 100 mm. Hg with removal of water formed during the reaction. The resulting product was a high molecular weight rubbery polyester that possessed excellent adhesive properties.

*Example VII*

A mixture of α,α'-diphenyladipic acid (1/20 mol) and ethylene glycol (1/20 mol) were heated, in an atmosphere of nitrogen, for one hour at 200° C., following which the temperature was raised to 260° C., and the pressure reduced to 100 mm. Hg. The mixture was maintained under such conditions for 24 hours, at the end of which time a high molecular weight polyester was obtained that possessed fiber-forming properties.

It should be apparent from the foregoing that the use of an acidic reactant comprising a diphenyladipic acid as aforedescribed for esterification reaction with a suitable glycol provides an extremely flexible means for preparation of ester products designed for a particular use or for any of many different purposes. For example, as set forth in Example I, a polyester was prepared from diphenyladipic acid that possessed properties suitable for its use as a non-migratory plasticizer for vinyl chloride resins; and as set forth in Example VII, by use of the same acid reacted with a different glycol, a fiber-forming polyester was prepared; and, as shown in Example VI, use of still the same acid with another glycol produced a rubbery polyester having adhesive properties. Moreover, and as shown by the remaining illustrative embodiments, the polyesters based on use of diphenyladipic acid were convertible to tough, resilient resins, infusible resins, hard, clear and non-shatterable resins by the described reactions with diisocyanates, styrene, and the like. Thus, and as aforediscussed, the use of a diphenyladipic acid for polyester and copolyester preparation, provides a means for preparation of products specially designed for uses wherein materials are desired for plasticizing high molecular weight materials, such as vinyl chloride; for uses wherein elastomeric materials are desired that are chemically inert and resistant to swelling; for uses wherein tough infusible resins are desired; and for uses wherein the desired materials should possess fiber-forming characteristics, adhesive characteristics, and others.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A polyester consisting of carbon, hydrogen and oxygen containing units of the following structure:

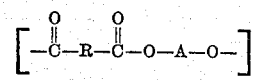

wherein A is the hydrocarbon portion of a glycol and R is the hydrocarbon portion of a dicarboxylic acid, and further characterized by containing a unit of the foregoing structure in which R is the hydrocarbon portion of a member from the group consisting of α,α'-diphenyladipic acid, an α,α'-diphenyladipic acid in which at least one of the phenyl radicals contains an alkyl substituent for a nuclear hydrogen atom, and mixtures of such acids.

2. A polyester consisting of carbon, hydrogen and oxygen containing units of the following structure:

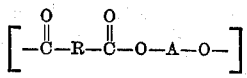

wherein A is the hydrocarbon portion of a glycol and R is the hydrocarbon portion of a dicarboxylic acid, and further characterized by containing a unit of the foregoing structure in which R is the hydrocarbon portion of α,α'-diphenyladipic acid.

3. An ester product of an organic glycol and a dicarboxylic acid from the group consisting of α,α'-diphenyladipic acid, α,α'-diphenyladipic acid in which at least one of the phenyl radicals contains an alkyl substituent for a nuclear hydrogen atom, and mixtures of such acids.

4. A process which comprises reacting a polyester, as defined in claim 3, with an excess amount of an organic diisocyanate to produce a diisocyanate modified chain-extended product of said polyester.

5. A diisocyanate modified polyester condensation product of an organic glycol and a dicarboxylic acid from the group consisting of α,α'-diphenyladipic acid, α,α'-diphenyladipic acid in which at least one of the phenyl radicals contains an alkyl substituent for a nuclear hydrogen atom, and mixtures of such acids, said polyester being characterized by being chain-extended by reaction of its terminal hydrogen-bearing groups with an organic diisocyanate.

6. An isocyanate modified polyester condensation product, as defined in claim 5, cross-linked by reaction with an organic compound selected from the group consisting of diamines, dibasic carboxylic acids, amino acids, hydroxy acids, amino alcohols and urea.

7. An unsaturated copolyester of an organic glycol and a dicarboxylic acid mixture comprising an ethylenically unsaturated dicarboxylic acid and another diacid from the group consisting of α,α'-diphenyladipic acid, α,α'-diphenyladipic acid in which at least one of the phenyl radicals contains an alkyl substituent for a nuclear hydrogen atom, and mixtures of such acids.

8. A composition comprising a polyester, as defined in claim 7, copolymerized with a vinyl aromatic compound from the group consisting of styrene, diallylphthalate and triallyl cyanurate.

9. A process which comprises polymerizing an unsaturated copolyester, as defined in claim 7, with a vinyl aromatic compound from the group consisting of styrene, diallylphthalate and triallyl cyanurate.

10. A process which comprises dissolving a copolyester, as defined in claim 7, in a vinyl aromatic compound that is a solvent for and is polymerizable with said copolyester to produce a polymerizable composition of said copolyester and vinyl aromatic compound.

11. A polymerizable composition consisting substantially of an unsaturated copolyester, as defined in claim 7, dissolved in a vinyl aromatic compound, that is a solvent for and is polymerizable with said polyester, in an amount sufficient to provide a composition polymerizable to a cured resin.

12. A polymerizable composition, as defined in claim 11, wherein the vinyl aromatic compound is styrene.

13. An unsaturated copolyester of an organic aliphatic glycol and a dicarboxylic acid mixture comprising an ethylenically unsaturated dicarboxylic acid and an $\alpha,\alpha'$-diphenyladipic acid.

14. An unsaturated copolyester of an organic glycol and a dicarboxylic acid mixture comprising maleic anhydride and $\alpha,\alpha'$-diphenyladipic acid.

15. A composition comprising an unsaturated copolyester, as defined in claim 14, polymerized with styrene.

16. A process which comprises condensing a glycol with a dicarboxylic acid while removing water from said condensation reaction to produce polyesters of said glycol and acid, said dicarboxylic acid reactant comprising a member from the group consisting of $\alpha,\alpha'$-diphenyladipic acid, $\alpha,\alpha'$-diphenyladipic acid in which at least one of the phenyl radicals contains an alkyl substituent for a nuclear hydrogen atom, and mixtures of such acids, said condensation being carried out using an excess amount of said glycol.

17. A process which comprises condensing a glycol with a mixture of an ethylenically unsaturated dibasic acid and another dibasic acid from the group consisting of $\alpha,\alpha'$-diphenyladipic acid, $\alpha,\alpha'$-diphenyladipic acid in which at least one of the phenyl radicals contains an alkyl substituent for a nuclear hydrogen atom, and mixtures of such acids, to produce an unsaturated copolyester of said glycol, unsaturated acid, and said other dibasic acid, said condensation being carried out using an excess amount of said glycol.

References Cited in the file of this patent

UNITED STATES PATENTS

| | | |
|---|---|---|
| 2,454,678 | Smith et al. | Nov. 28, 1948 |
| 2,529,512 | Ott | Nov. 14, 1950 |
| 2,533,455 | Hagemeyer | Dec. 12, 1950 |
| 2,537,375 | Simons | Jan. 9, 1951 |

OTHER REFERENCES

McElvain et al.: Chem. Abstracts, page 982, volume 46, 1952.

Ser. No. 397,714, Schlack (A.P.C.), published April 20, 1943.